(12) United States Patent
Morimitsu

(10) Patent No.: US 8,094,934 B2
(45) Date of Patent: Jan. 10, 2012

(54) OBJECT DETECTION SYSTEM

(75) Inventor: Noboru Morimitsu, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 911 days.

(21) Appl. No.: 12/042,831

(22) Filed: Mar. 5, 2008

(65) Prior Publication Data

US 2008/0219505 A1  Sep. 11, 2008

(30) Foreign Application Priority Data

Mar. 7, 2007  (JP) ................................. 2007-057059

(51) Int. Cl.
*G06K 9/00* (2006.01)
(52) U.S. Cl. ........................................ 382/168; 382/103
(58) Field of Classification Search .................. 382/103, 382/168–172, 173–180
See application file for complete search history.

(56) References Cited

U.S. PATENT DOCUMENTS

| | | | |
|---|---|---|---|
| 5,307,136 A | | 4/1994 | Saneyoshi |
| 5,410,346 A | * | 4/1995 | Saneyoshi et al. ............. 348/116 |
| 6,775,395 B2 | * | 8/2004 | Nishigaki et al. ............. 382/104 |
| 2005/0180602 A1 | * | 8/2005 | Yang et al. ..................... 382/103 |

FOREIGN PATENT DOCUMENTS

| | | |
|---|---|---|
| JP | 5-114099 | 5/1993 |
| JP | 5-265547 | 5/1993 |
| JP | 06-230115 | 8/1994 |
| JP | 09-171075 | 6/1997 |
| JP | 10-283461 | 10/1998 |
| JP | 10-283477 | 10/1998 |
| JP | 2001273494 | 10/2001 |

* cited by examiner

*Primary Examiner* — Alex Liew
(74) *Attorney, Agent, or Firm* — Smith, Gambrell & Russell, LLP

(57) ABSTRACT

An object detection system is provided a plurality of image capture units for capturing images of surroundings of the system, a distance information calculation unit for dividing a captured image which constitutes a reference of captured images captured by the plurality of image capture units into a plurality of pixel blocks, individually retrieving corresponding pixel positions within the other captured image for the pixel blocks, and individually calculating distance information, and a histogram generation module for dividing a range image representing the individual distance information of the pixel blocks calculated by the distance information calculation unit into a plurality of segments having predetermined sizes, providing histograms relating to the distance information for the respective divided segments, and casting the distance information of the pixel blocks to the histograms of the respective segments.

14 Claims, 16 Drawing Sheets

OBJECT DETECTION SYSTEM

CROSS REFERENCES TO RELATED APPLICATIONS

The disclosure of Japanese Patent Application No. 2007-057059 filed on Mar. 7, 2007 including the specifications, drawings, and abstracts are incorporated by references herein.

BACKGROUND OF INVENTION

1. Field of the Invention

The present invention relates to an object detection system and more particularly to an object detection system for detecting an object from a captured image captured by an image capture unit.

2. Description of the Related Art

In recent years, the development of technologies has been in progress in which by a passenger vehicle or a robot provided with artificial intelligence is equipped with a plurality of image capture units such as a pair of CCD (Charge Coupled Device) cameras to capture images of surroundings thereof and captured images are analyzed to measure positions and distances to objects which surround the vehicle or robot so as to detect the objects (for example, refer to JP-A-5-114099, JP-A-5-265547, JP-A-10-283461, and JP-A-10-283477).

In the technologies described above, in order to prevent the lenses of the CCD cameras from getting dirty and eliminate a failure of the cameras due to rain drops or the like sticking to the image capture units, the image capture units are normally designed to be mounted on an interior side of the windscreen of the vehicle or a glass is designed to be disposed in front of the image capture units so as to prevent the direct contact of the image capture units with outside air.

However, when dirt or rain drops stick to the windscreen or the glass disposed in front of the image capture units, images on which objects are captured are distorted or extra light is superposed due to the dirt or rain drops so sticking to the windscreen or the glass to thereby weaken signals from the objects themselves. Whereby the distances to the objects or the positions of the objects are caused to vary largely, causing a problem that the reliability in detection is decreased.

To cope with this problem, in JP-A-2001-273494, for example, there is proposed an object recognition system having a failsafe function to cause the system for observing by itself whether or not an object is being detected properly. In addition, in JP-A-6-230115 and JP-A-9-171075, there are proposed distance measuring systems provided with a radar system and an image capture unit to enhance the reliability in detection of objects.

However, the object recognition system described in JP-A-2001-273494 is such that a captured image is divided into a plurality of windows, a measured distance is calculated for each window by a stereo matching operation, and clustering is applied to the windows. Whereby objects are recognized based on clusters determined as valid, and although the reliability in object recognition is increased. When it rains comparatively heavily, the number of clusters determined as invalid is increased, and therefore, there is a possibility that the object recognition itself cannot be implemented.

In addition, in the object recognition systems described in JP-A-6-230115 and JP-A-9-171075, since the radar system is provided in addition to the image capture unit, highly reliable object detection is made possible under wide weather conditions from fine to rainy weathers. However, since the plurality of distance measuring systems including the radar system are necessary, there is a problem that it is difficult to realize a reduction in market price of the systems.

SUMMARY OF INVENTION

One or more embodiments of the invention are provided an object detection system which can detect objects lying around the system with high reliability by analyzing images captured by an image capture unit without using an additional distance measuring system such as a radar system.

According to a first aspect of the invention, an object detection system comprises a plurality of image capture unit for capturing images including a reference image and a comparing image, a distance information calculation unit for dividing the reference image into a plurality of pixel blocks, searching corresponding pixel positions within the comparative image for each of the pixel blocks, calculating distance information for each of the pixel blocks, and forming a range image representing distance information, a histogram generation module for dividing the range image into a plurality of segments having predetermined sizes, and generating a histogram relating to the distance information by voting the distance information of the pixel blocks to the histogram of the respective segments, an object detection module for detecting an object based on frequencies of classes to each of the histograms; and a reliability evaluation module for calculating an index of reliability of the distance information of each of the pixel blocks, wherein the histogram generation module changes a resolution for generating the histogram according to the index of reliability of the distance information of each of the pixel blocks.

According to a second aspect of the invention, the histogram generation module changes, as the resolution for generating the histogram, at least one of the size of the segments which divide the range image, a size of class divisions of the histogram, and an extent of a distribution range in voting by distributing the distance information of the pixel blocks to the classes of the histogram and classes which surround the classes of the histogram according to the index of reliability of the distance information of each of the pixel blocks.

According to a third aspect of the invention, the histogram generation module further generates, a second histogram for the respective segments based on the frequencies of the classes of the histogram implemented in predetermined filtering operations, and parameters for the predetermined filtering operations are changed according to the indexes of reliability of the distance information of the respective pixel blocks.

According to a forth aspect of the invention, the histogram generation module implements, as the predetermined filtering operation, a temporal smoothing operation for calculating a true value in the current sampling cycle by smoothing a temporal variation in the frequency of each class in each class of each histogram, and generates the second histogram by allocating the true values of the classes to corresponding classes of the second histogram.

According to a fifth aspect of the invention, the object detection system is provided that the parameter for the predetermined filtering operation which is to be changed is a time constant which is used in the temporal smoothing.

According to a sixth aspect of the invention, when the second histogram is arranged so that the corresponding classes are aligned into a straight line, in allocating the frequencies of the classes of the histogram to the corresponding classes of the second histogram, as the predetermined filtering operation, the histogram generation module implements a spatial smoothing operation for executing the allocation by distributing the frequencies to the class and classes of the second histogram to which the class belongs and the second histogram surrounding the second histogram of the class which surround the class of interest according to a predetermined distribution, so as to generate the second histogram.

According to a seventh aspect of the invention, the object detection system is provided that the parameter for the predetermined filtering operation which is to be changed is a distribution ratio for the classes which surrounds the classes in the spatial smoothing operation.

According to an eighth aspect of the invention, the object detection system is provided that the reliability evaluation module sets an evaluation window in a predetermined image area in the range image and calculate an index of reliability of the distance information of each of the pixel blocks based on a statistical value of the distance information of each of the pixel blocks within the evaluation window.

According to a ninth aspect of the invention, the object detection system is provided that the reliability evaluation module sets an evaluation window in an image area occupied by an object detected by the object detection module on the captured image which constitutes the reference and calculates an index of reliability of the distance information of each of the pixel blocks based on a statistical value of the distance information of each of the pixel blocks within the evaluation window so set.

According to a tenth aspect of the invention, the object detection module changes a threshold value for detection of the object based on the index of reliability of the distance information of each of the pixel blocks which is calculated by the reliability evaluation module.

According to the first aspect of the invention, even when the captured images are distorted due to rain or dirt sticking to the windscreen or noise due to extra light is mixed in the captured images, for example, by changing to reduce the resolution for generating the histograms such as the transverse resolution or temporal resolution in the actual space necessary for calculation of the distances to the objects, variations in the distances to the objects or the positions of the objects are suppressed. Whereby a stable detection of objects is enable, thereby making it possible to detect objects lying around the system with high reliability by analyzing the captured images.

In addition, since there is unnecessary to provide an additional distance measuring device such as a radar system and the image capture unit, an increase in production costs of the system is suppressed, thereby making it possible to realize a reduction in market price of the system.

According to the second aspect of the invention, by changing the size of the segments into which the range image is divided according to the index of reliability of the distance information as the resolution for generation of the histograms, the total number of distance information which is cast to the histograms can be increased Even though the frequencies of the classes of the respective histograms before the change vary due to rain or dirt on the windscreen, in the respective histograms after the change, the classes which impart the maximum frequencies can clearly discriminated.

Due to this, the classes having the maximum frequencies can clearly be discriminated from the histograms. By detecting objects based on the information, variations in the distances to objects detected or positions of the objects can be suppressed accurately. Therefore, the advantage of the first aspect of the invention can accurately be exhibited.

According to the third aspect of the invention, by generating the second histograms based on the result of the filtering operation for filtering the frequencies of the classes of the histograms in addition to the histograms and changing the parameter for the filtering operation according to the index of reliability of the distance information in the histogram generation module. Even though the frequencies of the classes of the histograms before the change are caused to vary due to rain or dirt sticking to the windscreen, the frequencies of the classes of the first histograms are smoothed to calculate true values therefor, and the second histograms can be generated based on the true values so calculated.

Due to this, the classes having the maximum frequencies can be discriminated from the second histograms based on the true values so calculated. By detecting objects based on the information, the variations in the distances to the objects detected or the positions thereof can accurately be suppressed, whereby the advantages of the aspects of the invention described above can be exhibited accurately.

According to the fourth aspect of the invention, by implementing the temporal smoothing operation on the frequencies of the classes of the first histograms collected as the filtering operation, even though the frequencies of the classes of the histograms before the change take values which vary temporally due to rain or dirt sticking to the windscreen, the true values can be calculated in an ensured fashion, which generates the second histograms based on the true values so calculated. Therefore, the advantage of the third aspect of the invention can accurately be exhibited.

According to the fifth aspect of the invention, by changing the time constant used in the temporal smoothing operation according to the index of reliability in the distance information, the classes having the maximum frequencies can clearly be discriminated from the second histograms which are based on the true values. By detecting the objects based on the information, the temporal variations in the distances to the objects or positions thereof can accurately be suppressed. Therefore, the advantages of the respective aspects of the invention that have been described above can accurately be exhibited.

According to the sixth aspect of the invention, by implementing the spatial smoothing operation as the filtering operation, even though the frequencies of the classes of the histograms before the change take values which disperse in the respective histograms, the frequencies of the classes of the second histograms which vary largely spatially can be smoothed to calculate true values, and the second histograms can be generated based on the true values. Therefore, the advantage of the third aspect of the invention can accurately be exhibited.

According to the seventh aspect of the invention, by changing the distribution ratio to the classes which surround the classes in the spatial smoothing operation according to the index of reliability in the distance information, the classes having the maximum frequencies can clearly be discriminated from the second histograms which are based on the true values. By detecting objects based on the information, the spatial variations in the distances to the object or positions thereof can be suppressed. Therefore, the advantages of the respective aspects of the invention that have been described above can accurately be exhibited.

According to the eighth aspect of the invention, by setting the evaluation window in the predetermined image area on the range image and calculating the index of reliability in the distance information based on the static value such as the dispersion of the distance information in the pixel blocks within the evaluation window, it is possible to evaluate accurately whether or not the reliability in the distance information is decreased due to rain or dirt sticking to the windscreen.

Whereby the advantages of the respective aspects of the invention that have been described above can accurately be exhibited. In addition, by limiting the setting of the evaluation window to the predetermined image area, the amount of indices calculated can be decreased.

According to the ninth aspect of the invention, there is a high possibility that an object will also be detected in the next time's sampling cycle in the image area where the object was detected in the last sampling cycle. Then, by setting the evaluation window in the image area where the object was detected in the last sampling cycle, an object is caught within the evaluation window in an ensured fashion. And the distance information is accurately calculated at an edge portion of the image area, whereby a statistic value thereof is accurately calculated.

Due to this, the index of reliability in the distance information can be calculated based on the statistic amount calculated accurately, whereby the index can be calculated with high reliability, and the resolution for generating the histograms can accurately be changed based on the index so calculated. Therefore, the advantages of the respective aspects of the invention that have been described above are accurately exhibited.

According to the tenth aspect of the invention, by changing the threshold for detection of objects according the index of reliability in the distance information, it is possible to detect objects accurately even under the conditions where it rains or the windscreen is stained with dirt, whereby the advantages of the respective aspects of the invention that have been described above can accurately be exhibited.

Other aspects and advantages of the invention will be apparent from the following description and the appended claims.

BRIEF DESCRIPTION OF THE DRAWINGS

FIG. 6 is diagrams showing lane models formed, of which FIG. 6A shows a horizontal shape model, and FIG. 6B shows a road height model.

DESCRIPTION OF EXEMPLARY EMBODIMENTS

In this embodiment, while an object detection system will be described which is fitted on a vehicle for detecting objects including a preceding vehicle which exist on or above the road surface ahead of the vehicle, the application of the object detection system according to the aspect of the invention is not limited to the fitment on the vehicle and the detection of objects lying on or above the road surface.

Figure 1:
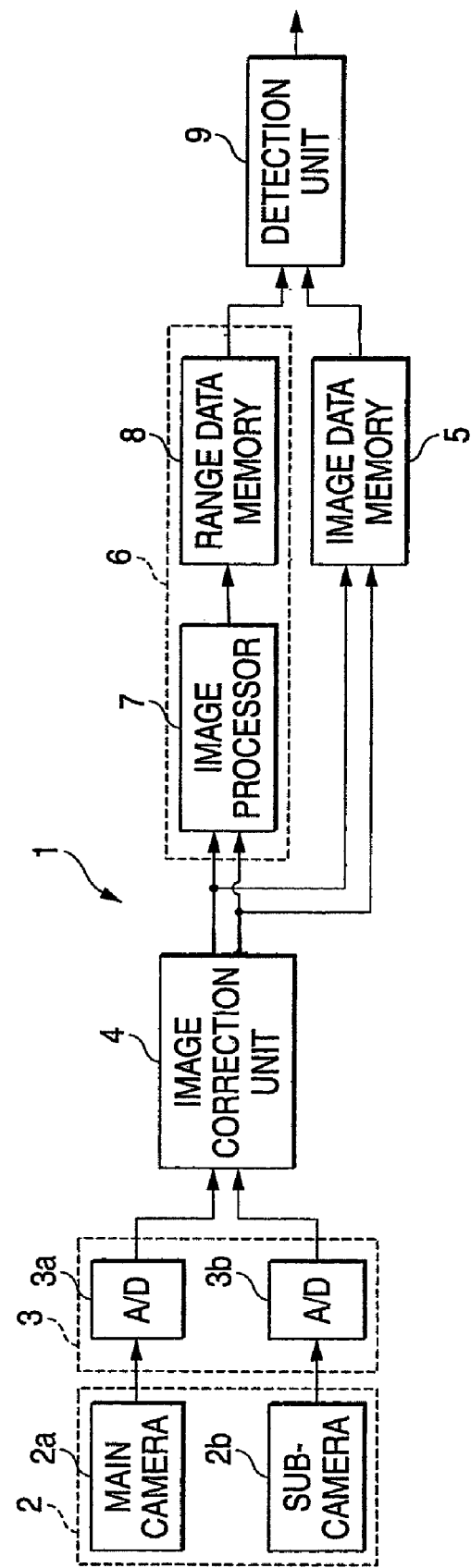
FIG. 1 is a block diagram showing the configuration of an object detection system according to an embodiment of the invention.

As is shown in FIG. 1, an object detection system 1 according to the embodiment is made up mainly of an image capture unit 2, a conversion unit 3, a distance information calculation unit 6, and a detection unit 9.

Note that the configuration from the image capture unit 2 to the distance information calculation unit 6 is described in detail in JP-A-5-114099, JP-A-5-265547, JP-A-10-283461, and JP-A-10-283477 which are published documents of the Japanese unexamined patent applications that had been filed by the applicant of this patent application and therefore, the published documents raised above should be referred to for detail description of the configuration of interest. Hereinafter, the configuration from the image capture unit 2 to the distance information calculation unit 6 will be described briefly.

In this embodiment, the image capture unit 2 is a stereo camera made up of a pair of a main camera 2a and a sub-camera 2b, which each incorporate an image sensor such as a CCD or a CMOS sensor and which are mounted, for example, in the vicinity of an inside rearview mirror in a passenger compartment of a subject vehicle, that is, on an inner side of the windscreen in such a manner as to be spaced apart in a transverse direction of the subject vehicle, and is configured to capture at a predetermined sampling cycle an image of surroundings in front of the subject vehicle so as to output a pair of images.

Figure 2:
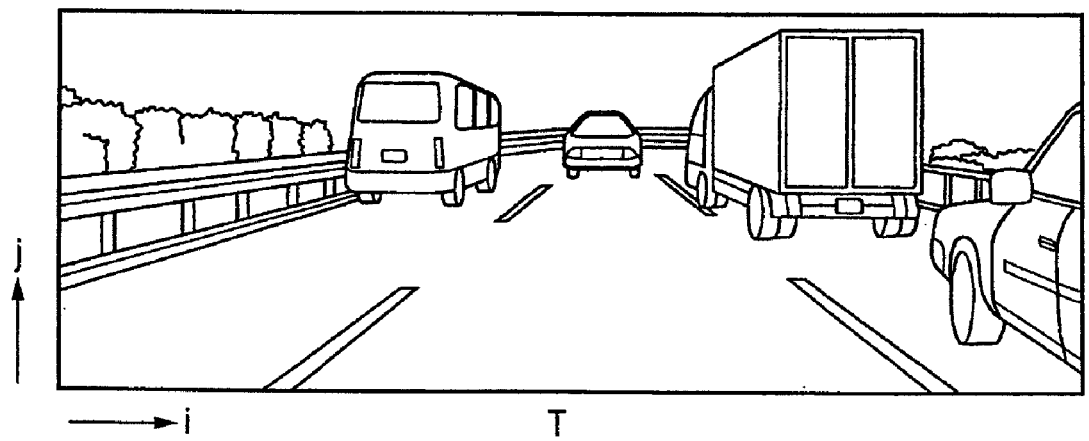
FIG. 2 is a diagram showing an example of a reference image.

In this embodiment, of the pair of cameras making up the image capture unit 2, the camera lying closer to the driver functions as the main camera 2a for capturing. For example, an image T shown in FIG. 2 which constitutes a reference (hereinafter, referred to as a reference image T). In addition, the sub-camera 2b captures a comparison image which is to be compared with the reference image T. Note that the comparison image is an image which looks like the reference image T and hence, the illustration thereof is omitted.

Image data outputted from the main camera 2a and the sub-camera 2b is converted from analog images to digital images which are each made up of pixels each having a brightness value on a predetermined brightness level of the gray or brightness scale spread out over 256 gray or brightness levels by A/D converters 3a, 3b which make up the conversion module 3, the digital images so converted are subjected to image correction in an image correction unit 4 to remove deviation and noise, and the resulting images so corrected are then stored in an image data memory 5 and at the same time are transmitted to the distance information calculation unit 6.

In an image processor 7 in the distance information calculation unit 6, a stereo matching operation and a filtering operation are performed on the image data of the reference image T and the comparison image so as to calculate a disparity dp as a distance which corresponds to a distance from the image capture unit 2 to an object captured in the reference image T in an actual space.

Specifically, in the stereo matching operation, the image processor 7 divides the reference image T into pixel blocks each having a size of, for example, 4×4 pixels. In addition, the image processor 7 retrieves pixel blocks of 4×4 pixels on the comparison image for a pixel block whose city block distance CB, which is expressed by Equation (1) below, is the smallest for each of the pixel blocks on the reference image T. Here, the brightness levels of pixels at coordinates (i, j) on the reference image T and the comparison image are expressed by p1$ij$, p2$ij$, respectively:

$$CB=\Sigma|p1ij-p2ij| \tag{1}$$

As this occurs, in this embodiment, the image processor 7 retrieves the pixel block on the comparison block which is situated in the same position on the j coordinate as the pixel block on the reference image T pixel by pixel horizontally in the i direction, and when the pixel block whose city block distance CB becomes the smallest is found, the image processor 7 calculates a deviation amount, that is, a disparity dp between the pixel block of interest on the comparison image and the pixel block of interest on the reference image T. In addition, the image processor 7 carrys out the calculation of disparity dp for all the pixel blocks on the reference image T.

In addition, for the purpose of enhancing the reliability of the disparity dp, the image processor 7 performs a filtering operation on the disparities obtained so as to output only the disparities which are determined as valid. Namely, for example, in an image area made up of an image of a vehicle road and lacking features, the result of the stereo matching operation is not much reliable, and even when a disparity dp is calculated, the reliability of the disparity dp calculated is low. Due to this, a disparity dp like this is made invalid in the filtering operation, and 0 is outputted as the value of the disparity dp.

Figure 3:
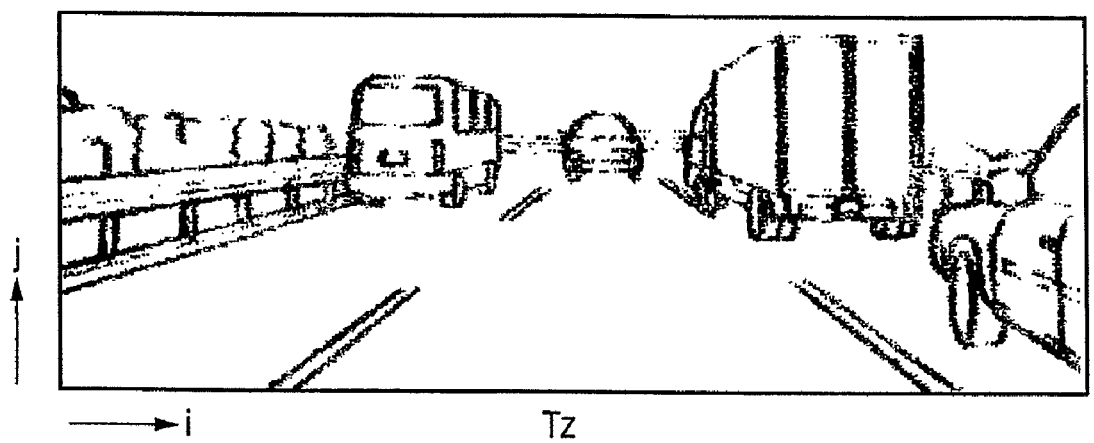
FIG. 3 is a diagram showing a range image calculated based on the reference image in FIG. 2 or the like, FIG. 4 is a block diagram showing the configuration of a detection module of the object detection system.

Consequently, the disparities dp outputted from the image processor 7 normally constitute data in which there is a large difference in brightness value between pixels which are aligned adjacent in the transverse direction mainly on the reference image T or a so-called edge portion has a valid value. Therefore, for example, as is shown in FIG. 3, an image which represents the disparities dp in the form of images, that is, a range image Tz becomes an image in which a valid value exists in an edge portion of an object captured while numeral 0 is allocated to an image area lacking features such as an image of the vehicle road.

In addition, points (X, Y, Z) on actual space which results when assuming that the disparity dp, a point (i, j) on the range image Tz and a point on the road surface which lies directly below a center between the pair of cameras 2a, 2b are original points and that a vehicle-width or transverse direction of the subject vehicle is an X-axis direction, a vehicle-height or vertical direction is a Y-axis direction and a vehicle-length or longitudinal direction is a Z-axis direction are associated uniformly by coordinate transformations which are expressed by Equations (2) to (4) below. In addition, in the respective equations below, CD denotes the interval between the pair of cameras, PW the angle of field of view, CH the mounting height of the pair of cameras, IV and JV an i coordinate and a j coordinate on the range image of a point at infinity front side of the subject vehicle and DP a vanishing point disparity.

$$X=CD/2+Z\times PW\times(i-IV) \tag{2}$$

$$Y=CH+Z\times PW\times(j-JV) \tag{3}$$

$$Z=CD/(PW\times(dp-DP)) \tag{4}$$

In this way, the distance information calculation unit 6 calculates the disparity dp for each pixel block so as to form the range image Tz and transmits the information to the detection unit 9 at the same time that the information is stored in a range data memory 8.

The detection unit 9 is made up of a computer in which a CPU, a ROM, a RAM, and an input/output interface are connected to a bus. In addition, sensors such as a vehicle speed sensor, a yaw rate sensor, and a steering sensor for measuring a turning or steering angle of a steering wheel are connected to the detection unit 9 as required.

Figure 4:
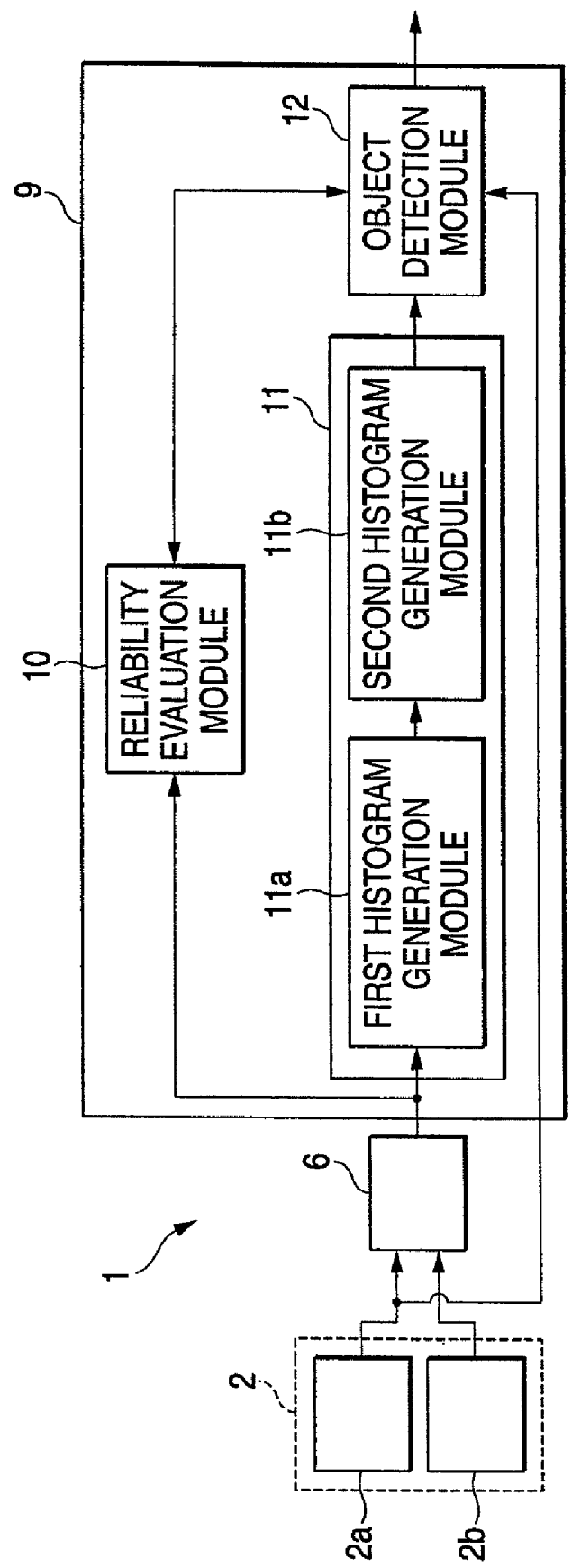

The detection unit 9 includes a reliability evaluation module 10, a histogram generation module 11 and an object detection module 12, as is shown in FIG. 4. Furthermore, the detection unit 9 includes a memory, not shown. Note that hereinafter, as a matter of convenience, the histogram generation module 11 will be described as being divided into a first histogram generation module 11a and a second histogram generation module 11b.

The reliability evaluation module 10 calculates an index of reliability in the disparity dp based on the disparity dp which is the distance information allocated to the pixel blocks of the range image Tz.

Figure 5:
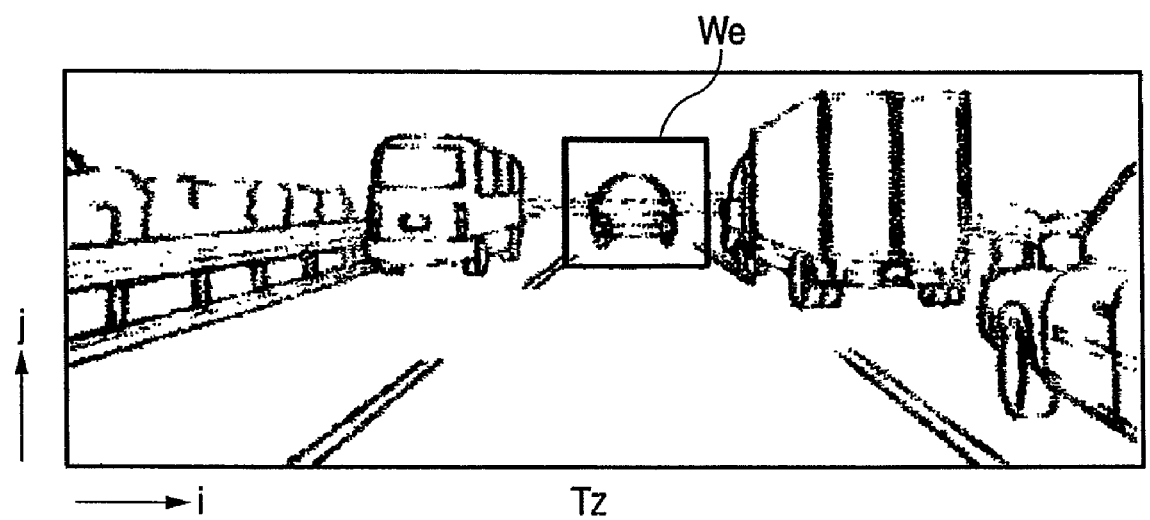
FIG. 5 is a diagram showing an evaluation window set on the range image.

Specifically, as is shown in FIG. 5, the reliability evaluation module 10 firstly sets an evaluation window We of a predetermined size in a substantially central image area which includes a pixel block corresponding, for example, to a point of infinity on the range image Tz and calculates an index of reliability in disparity dp based on a statistic value of disparities of pixel blocks within the evaluation window We.

In addition, as described above, objects existing on or above the road surface are detected. Due to this, the reliability evaluation module 10 recognizes based on the reference image T and the range image Tz lane marking lines indicated on the road surface such as an overtaking prohibiting region marking line and a partition marking line which partitions a vehicle lane from the side of the road and then recognize the road surface based on the lines so recognized. In addition, the reliability evaluation module 10 further calculates an index of reliability only for disparities which correspond to distances the objects lying on or above the road surface in the disparities of the pixel blocks within the evaluation window We.

The configuration of the lane marking lines recognition adopts the configuration of the lane marking lines recognition system described in JP-A-2006-331389 which is the Japanese unexamined patent publication document disclosing the relevant patent application filed by the applicant of the this patent application. However, it is possible to make any other configuration described above if it recognizes road marking lines.

Figure 6:
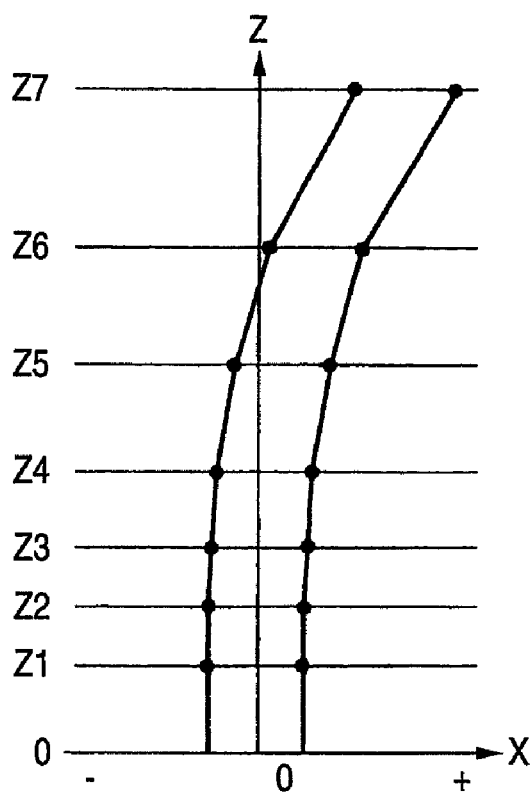
Figure 6:
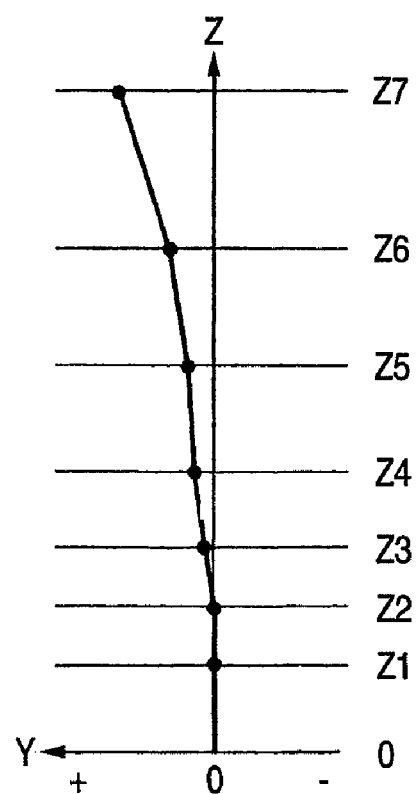

In addition, the reliability evaluation module 10 forms a lane model in a three-dimensional fashion based on information on lane marking lines detected on the left- and right-side of the subject vehicle. The lane model is formed, as is shown, for example, in FIGS. 6A, 6B, by approximating the lane marking lines on the left- and right-side of the subject vehicle segment by segment by three-dimensional linear equations (5) to (8) shown below and connecting the results of the approximations into a polygonal line. Note that FIG. 6A shows a road model on a Z-X plane, that is, a horizontal shape mode, and FIG. 6B shows a road model on a Z-Y plane, that is, a road height model.

[Horizontal Shape Model]

Right Lane Marking Line $X = aR \cdot Z + bR$  (5)

Left Lane Marking Line $X = aL \cdot Z + bL$  (6)

[Road Height Model]

Right Lane Marking Line $Y = cR \cdot Z + dR$  (7)

Left Lane Marking Line $Y = cL \cdot Z + dL$  (8)

In this embodiment, the reliability evaluation module 10 is designed to recognize the road surface based on the lane model formed in the way described above. In addition, in the event that a height Ydp which is obtained by substituting dp in Equation (4) above with the disparities dp which are allocated to the pixel blocks within the evaluation window We and then substituting Z in Equation (3) with the distance Z so calculated by Equation (4) is situated in a position which is higher by a fixed certain value or more than a road height Y resulting at the distance Z in the road height model, the reliability evaluation module 10 determines that the disparity dp is the disparity dp which corresponds to the distance to the object lying on or above the road surface and determines the disparity or the distance as an object for which an index of reliability is to be calculated, rejecting the other disparities from objects for which an index of reliability is to be calculated. The reliability evaluation module 10 also excludes the pixel blocks to which 0 is allocated as the value of its disparity dp from objects for which an index of reliability is to be calculated.

As an index of reliability in disparity dp, the reliability evaluation module 10 calculates a variance $\sigma dp^2$ of the disparity dp which is expressed by Equation (9) below:

$$\sigma dp^2 = \Sigma (dp - dpave)^2 \quad (9)$$

Figure 7:
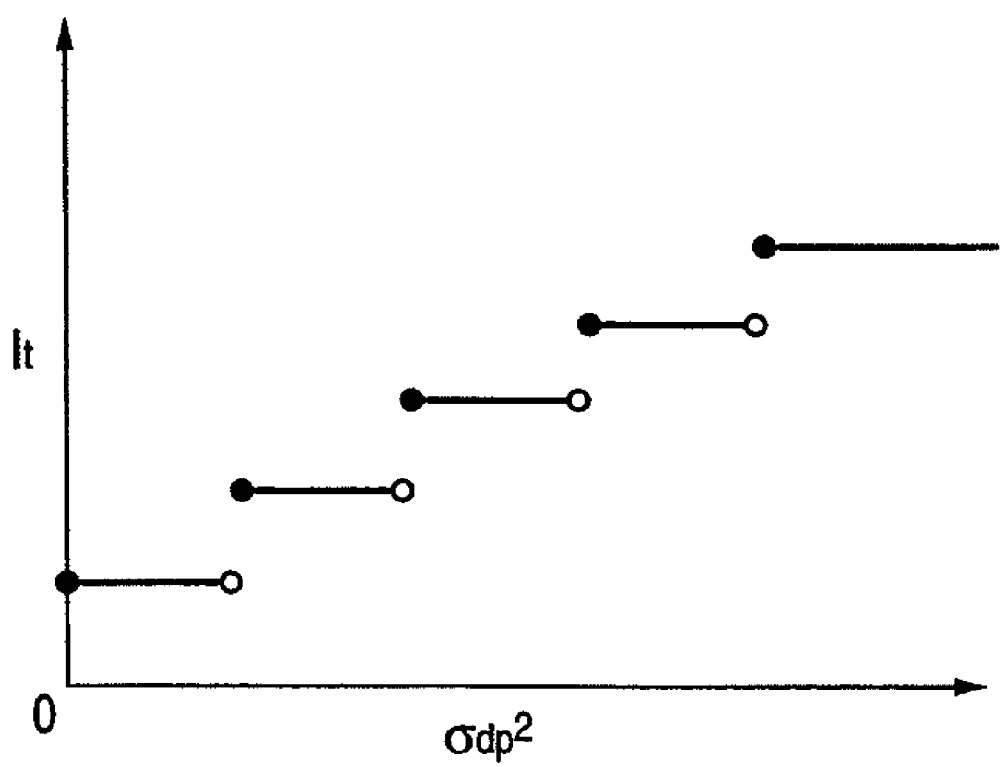
FIG. 7 is a graph showing a relationship between a statistic value of distance information, that is, a variance in disparity and an index of reliability.

In addition, the reliability evaluation module 10 calculates a variance as a number value by associating variance $\sigma dp^2$ with a reliability index It as is shown in a graph in FIG. 7 and outputs an index It of reliability to the histogram generation module 11 and the object detection module 12 according the $\sigma dp^2$. In addition, the information on the disparity dp which is determined as the disparity corresponding to the distance to the object on or above the road surface is also outputted to the histogram generation module 11 and the object detection module 12.

The histogram generation module 11 generates a histogram associated with the distance information or the disparity dp which is used for detection of an object from the reference image T in the object detection module 12, which will be described later.

In this embodiment, the first histogram generation module 11a of the histogram generation module 11 is to divide the range image Tz in which the disparities dp are assigned to the pixel blocks into a plurality of segments of a predetermined size and generate a first histogram associated the disparity dp for each segment.

Figure 8:
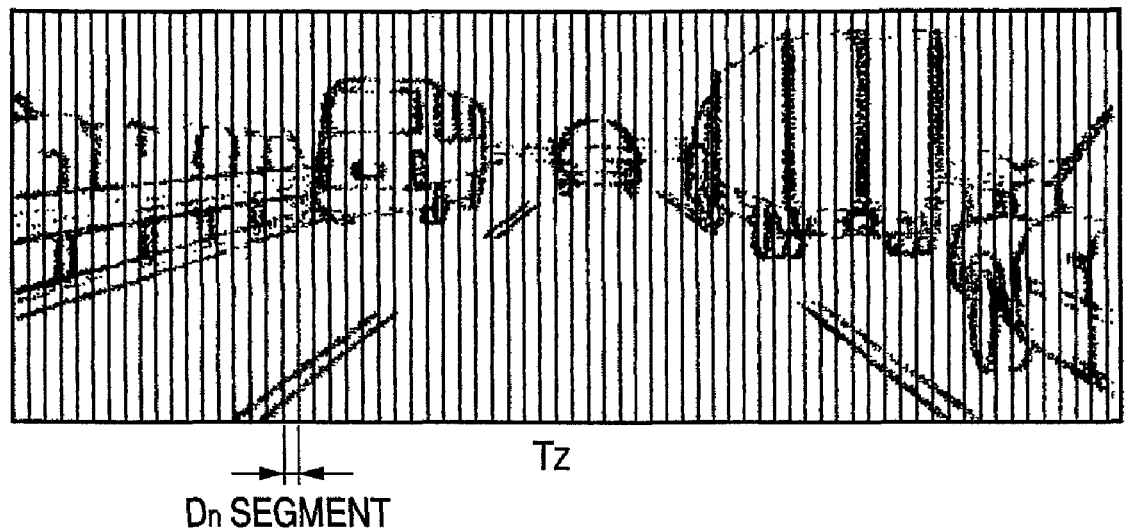
FIG. 8 is a diagram showing segments which divide the range image.

Specifically, the first histogram generation module 11a is to divide the range image Tz which was calculated by assigning the disparities dp to the pixel blocks in the distance information calculation unit 6 into the plurality of segments of a predetermined size. In this embodiment, as is shown in FIG. 8, the range image Tz is divided into strip-like segments Dn which extend vertically.

Figure 9:
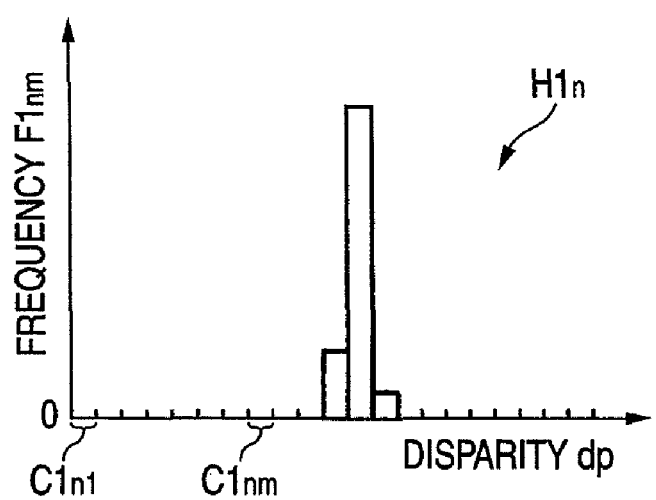
FIG. 9 is a diagram showing an example of a first histogram generated.

In addition, the first histogram generation module 11a provides individually the segments Dn so divided with a first histogram H1n as is shown in FIG. 9 which is associated with the disparity dp which exists on or above the road surface. Namely, in the event that the segments Dn are 120 segments spread over for example from D1 to D120, the first histogram H1n is provided 120 for the segments Dn. In addition, a class of te first histogram H1n is class divided into classes of a predetermined class width commonly over the whole histograms.

In addition, disparities dp existing on or above the road surface which belong to the segment Dn are sequentially cast to the first histogram H1n of the segment of interest. As a result, as is shown in FIG. 9, a first histogram H1n is generated in which frequencies F1nm are distributed to classes. The first histogram generation module 11a implements the generation operation of the first histogram H1n on the whole of the segments Dn.

In addition, the first histogram generation module 11a changes the resolution for generating the first histograms H1n according to the index It of reliability in disparity dp which is sent from the reliability evaluation module 10.

In this embodiment, the first histogram generation module 11a changes the size of the segments Dn, that is, the transverse width of the strip-like segments Dn which make up the range image Tz according to the index It of reliability in disparity dp, and for example, in the event that the index It of reliability in disparity increases step by step as is shown in FIG. 7, the first histogram generation module 11a changes the transverse width of the segments Dn to increase by twice, three times, and the like. the transverse width thereof which results when the index of reliability in disparity dp takes its minimum value as the index of reliability increases.

Due to this, letting a situation where the index It of reliability in disparity dp takes its minimum value be a standard state, and assuming that the strip-like segments Dn so divided are 120 segments in the standard state, the number of segments is changed as decreasing from 120 segments to 60 segments, 40 segments, . . . , every time the reliability index It is incremented, and the number of first histograms to be generated is also changed from 120 histograms in the standard state down to 60 histograms, 40 histograms, . . . .

The second histogram generation module 11b applies a predetermined filtering operation to the frequencies F1nm of the classes of the first histograms H1n generated by the first histogram generation module 11a so as to calculate true values of the frequencies, so that a second histogram H2n is generated for each of the segments Dn.

In this embodiment, as the filtering operation, the second histogram generation module 11b implements a temporal smoothing operation for smoothing temporal changes in the frequencies of the classes C1nm of the first histograms H1n which are collected by the first histogram generation module 11a.

Figure 10:
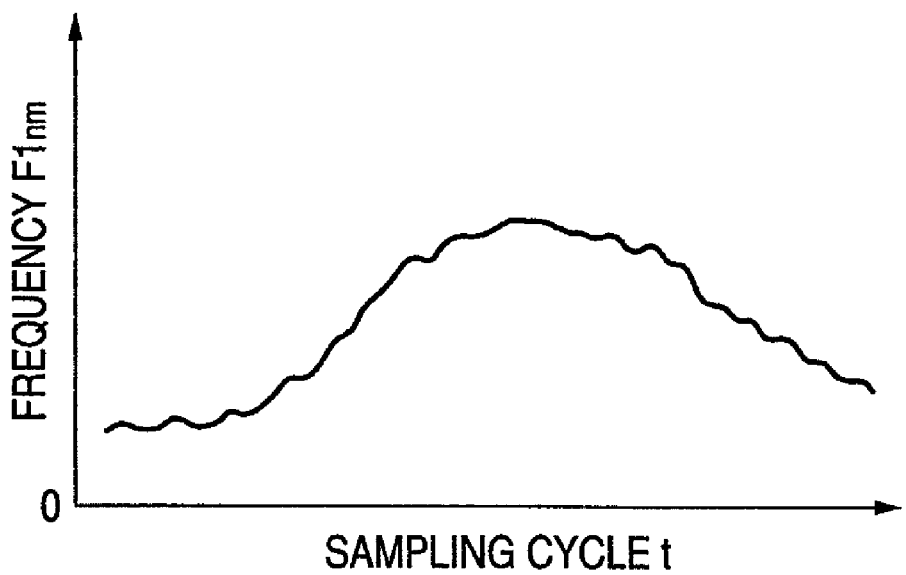
FIG. 10 is a graph showing an example of a temporal variation in frequency of classes in the first histogram.

Specifically, as is shown in FIG. 10, the frequency F1nm of each of the classes of each of the first histograms changes temporally, that is, in each sampling cycle. Due to this, in this embodiment, a true value F1$nm$real(t) of the frequency F1$nm$ of each of the classes of each of the first histograms H1$n$ is calculated according to the following equation (10) below and which is calculated is overwritten on the memory for update:

$$F1nmreal(t)=F1nmreal(t-1)\times(1-Pt)+F1nm(t)\times Pt \quad (10)$$

Here, F1$nm$real (t) and F1$nm$real (t−1) denote, respectively, the true values F1$nm$real of the frequencies in this time's and previous sampling cycles t, t−1, and F1$nm$(t) denotes the frequency F1$nm$ of each of the classes C1$nm$ of each of the first histograms It generated in this time's sampling cycle t.

In addition, in Equation (10), Pt denotes a time constant and is changed within a number value range of $0 \leq Pt \leq 1$ according to the index It of reliability in disparity dp which is transmitted from the reliability evaluation module 10. In this embodiment, in the standard state where the minimum value of the index It of reliability in disparity dp is outputted from the reliability evaluation module 10, Pt is designed to be Pt=1, and the value of Pt is set to decrease as the index It of reliability increases.

Consequently, in the standard state, since the time constant Pt is 1, Equation (10) is then expressed by $$F1nmreal(t)=F1nm(t) \quad (11)$$

The true value F1$nm$real (t) of the frequency F1$nm$ of each class C1$nm$ becomes the frequency F1$nm$(t) collected by the first histogram generation module 11$a$ in this time's sampling cycle t. Namely, in the standard state where the variance (dp2 of the disparity dp becomes the smallest and the minimum value of the index It of reliability in disparity dp is outputted, the frequency F1$nm$(t) of each of the classes of each of the first histograms collected by the first histogram generation module 11$a$ is regarded as representing the true value as it is.

Figure 11:
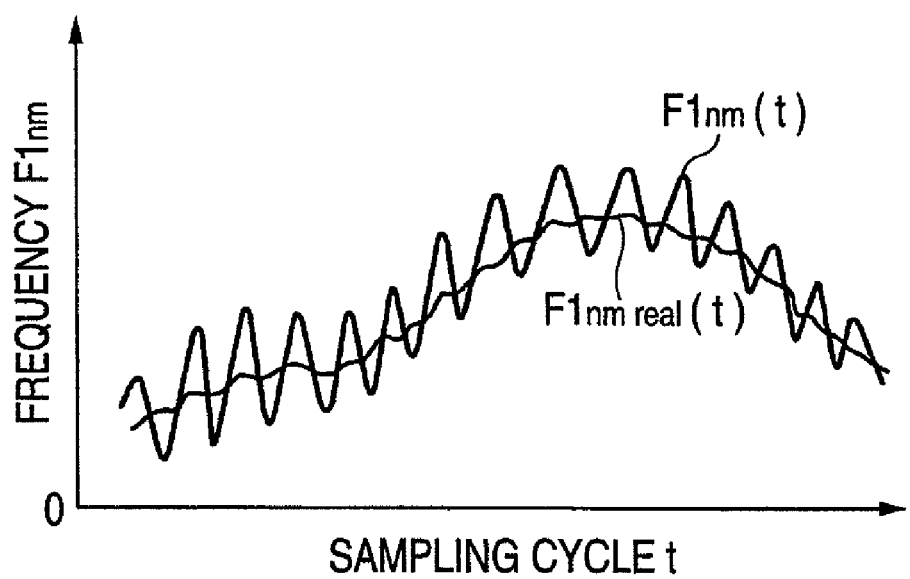
FIG. 11 is a graph showing violent fluctuation of frequencies and true values calculated by a temporal smoothing operation.

When the variance (dp2 of the disparity dp2 becomes large and hence, the value of the index It of reliability in disparity dp increases, however, as is shown in FIG. 11, the fluctuation in value of the frequency F1$nm$(t) of the classes becomes large. As this occurs, the value of the time constant Pt is decreased, the frequency F2$nm$(t) in each sampling cycle t is smoothed by Equation (10), and the smoothed value of the frequency F1$nm$(t) is then regarded as the true value F1$nm$real(t).

The second histogram generation module 11$b$ allocates the true values F2$nm$real (t) of the frequencies F1$nm$ of the classes C1$nm$ which were calculated in the way described above to the classes C2$nm$ of the second histograms H2$n$ which correspond to the first histograms H1$n$ as frequencies F2$nm$ so as to generate the second histograms H2$n$.

Figure 12:
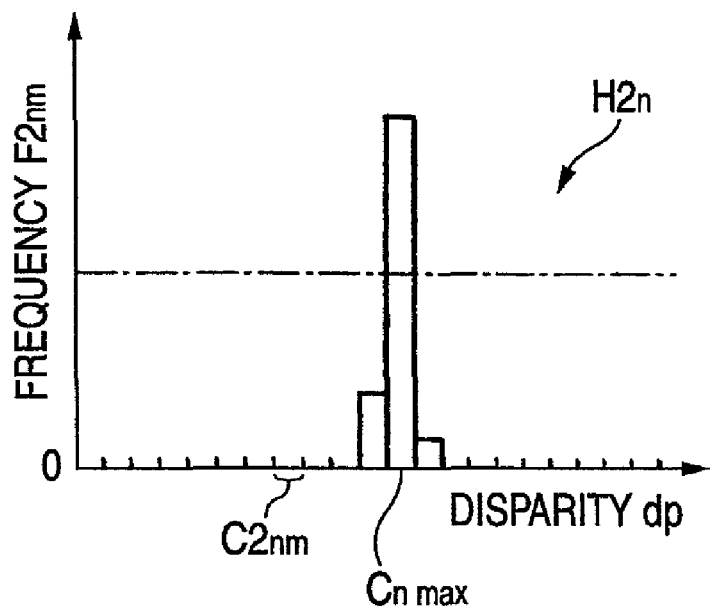
FIG. 12 is a diagram showing a second histogram generated from the first histogram shown in FIG. 9 in a standard state.

Consequently, in the standard state where the index It of reliability in disparity dp takes its minimumvalue, since the true value F1$nm$real(t) is equal to the collected frequencies F1$nm$(t) from Equation (11), as is shown in FIG. 12, a second histogram H2$n$ to be generated for each segment Dn becomes a histogram which is the same in shape as the first histogram Hn1 for the segment of interest.

Figure 13:
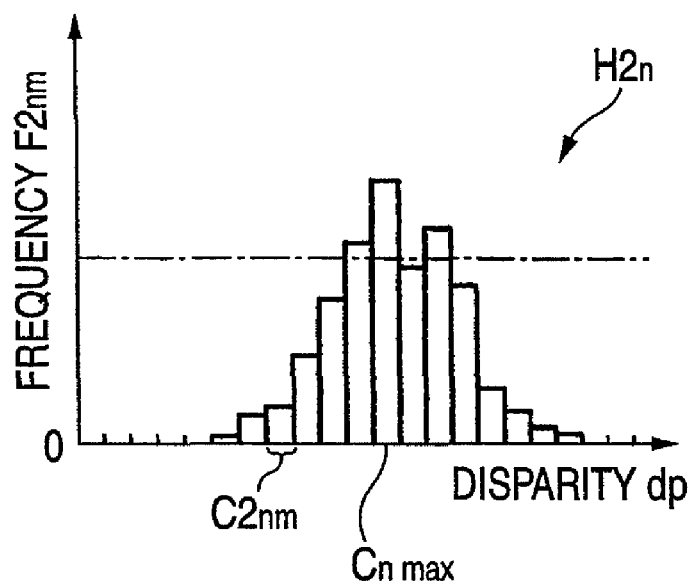
FIG. 13 is a diagram showing a second histogram generated by true values being allocated by the temporal smoothing operation.

In addition, in such a state that the index It of reliability in disparity dp is larger than its minimum value, the values resulting when frequencies F1$nm$(t) of the classes C1$nm$ of the first histograms H1$n$ are smoothed temporally constitutes the true values F1$nm$real (t), and as is shown in FIG. 13, the corresponding true values F1$nm$real (t) of the classes of the first histograms are allocated to the classes C2$nm$ of the second histograms H2$n$, so as to generate the second histograms H2$n$.

The second histogram generation module 11$b$ outputs in the classes C2$nm$ of the second histogram H2$n$ of each segment Dn generated in the way described above the class whose frequency F2$nm$ is equal to or more than a threshold value indicated by an alternate long and short dash line in FIGS. 12 and 13 and which imparts a largest frequency as a largest class Cnmax for each segment Dn and at the same time save it in the memory.

Note that while the largest class Cmax is detected one for each segment Dn, in the event that all the frequencies F2$nm$ of the classes of the second histogram H2$n$ are less than the threshold value, it is regarded that the largest class Cmax has been detected.

The object detection module 12 detects an object on the reference image T based on the largest classes Cnmax which were detected in the segments Dn of the range image Tz.

Figure 14:
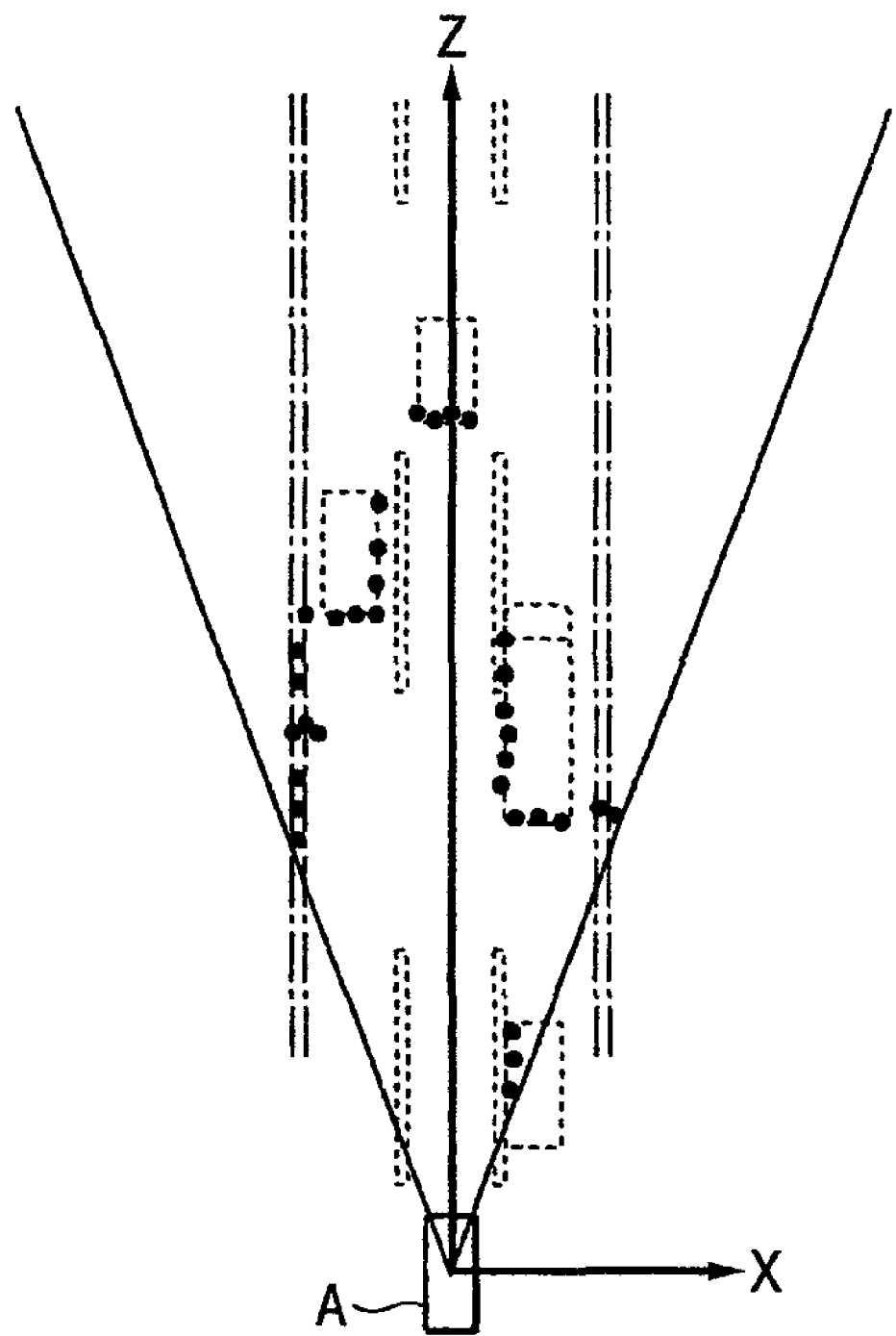
FIG. 14 is a diagram showing distances calculated from a disparity of a class which has a largest frequency which are plotted in an actual space.

Specifically, the object detection module 12 allocates the disparities dp at lower limits of the largest classes of the segments Dn, that is, the least disparities dp of the largest classes to the segments Dn and substitutes dp in Equation (4) above with the disparities dp to calculate distances Z from the subject vehicle to objects for the segments Dn. The distances Z to the objects in the segments Dn are plotted in the actual space, as is shown in FIG. 14, information on the distances Z is plotted as points in portions which correspond to portions of objects ahead which face the subject vehicle A while slightly scattered.

Figure 15:
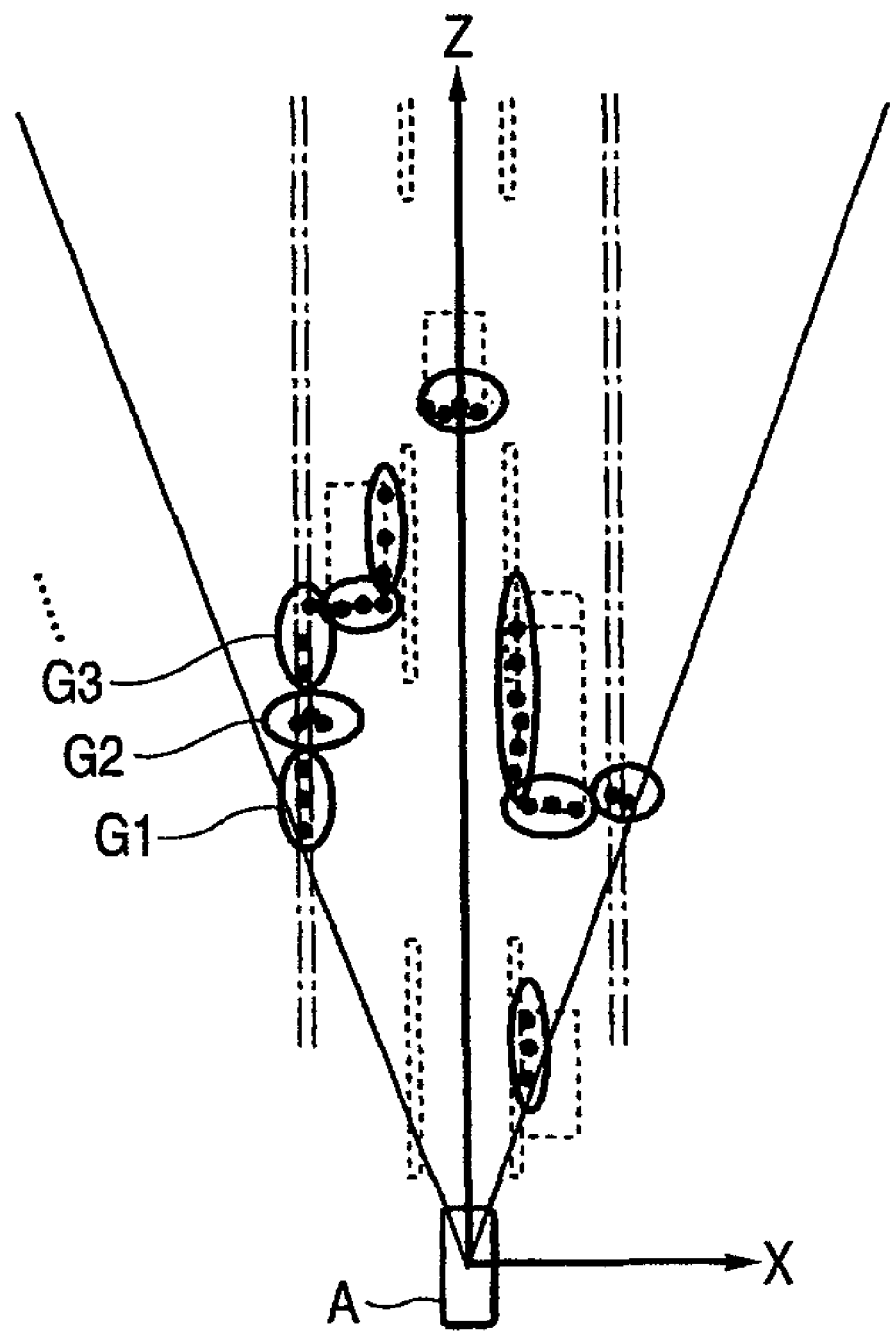
FIG. 15 is a diagram which explains grouping of points plotted in FIG. 14.

While retrieving distances in the X-axis direction and Z-axis direction of the points of those points plotted in the way described above which are aligned adjacent to each other in those directions and overall lengths spread from left-end point to right-end point in the X-axis direction of groups of the adjacent points when they are grouped, the object detection module 12 collects and groups the points which are aligned or grouped in the ways described above and whose lengths in the X- or Z-axis direction or overall lengths in the X-axis direction fall within set threshold values into groups G1, G2, G3, . . . , respectively, as is shown in FIG. 15.

Figure 16:
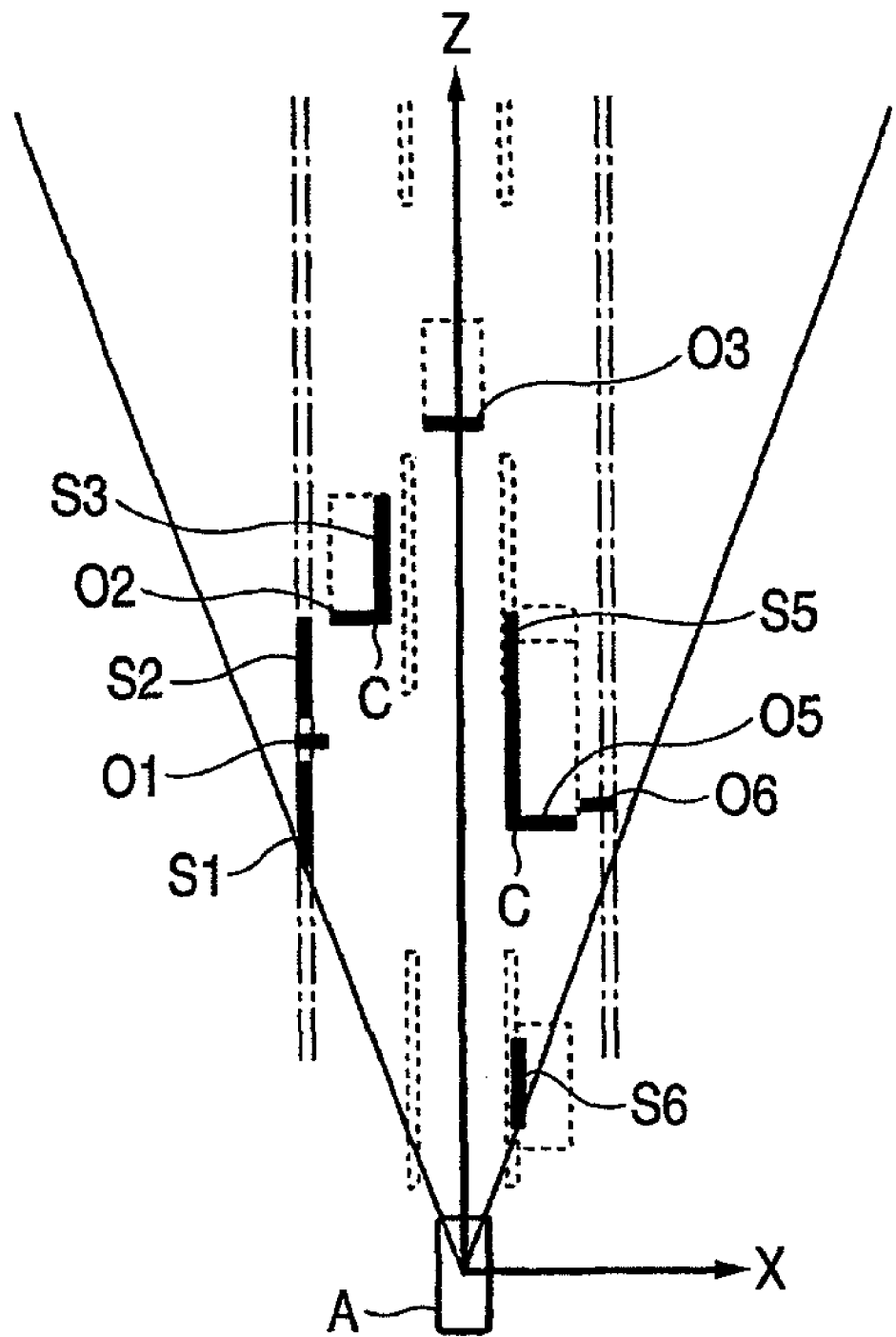
FIG. 16 is a diagram which explains objects detected as "objects" or "side walls" based on the grouping in FIG. 15.

Then, as is shown in FIG. 16, the object detection module 12 straight line approximates the points within the groups and labels and classifies groups in which the approximated straight lines extend substantially parallel to the vehicle-width direction of the subject vehicle A or the X-axis direction as "object" O1 to O6 and labels and classifies the groups in which the points are aligned substantially parallel to the traveling direction of the subject vehicle A or the Z-axis direction as "side wall" S1 to S6. In addition, an intersection point of an "object" and a "side wall" which are regarded as the same object is labeled as a corner point C.

Figure 17:
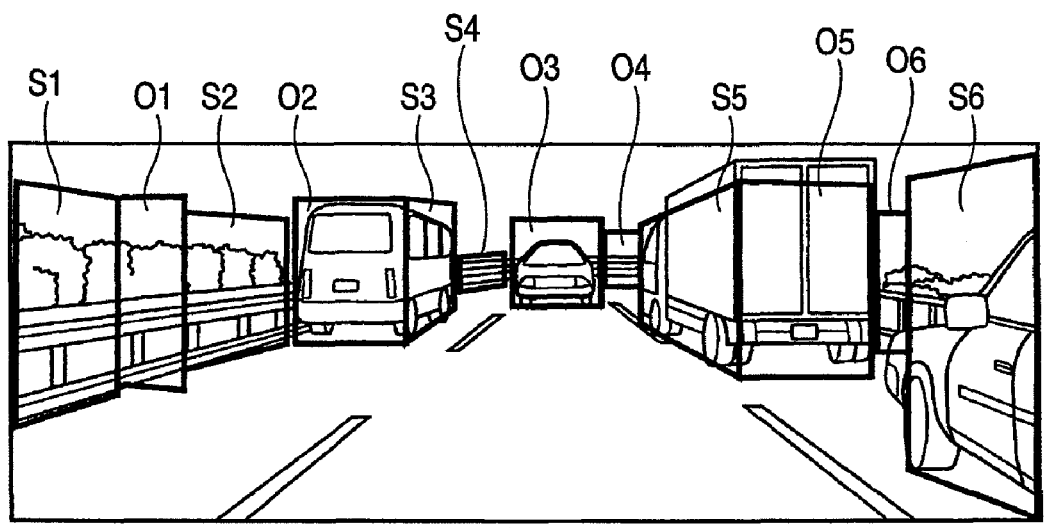
FIG. 17 is a diagram showing objects which are detected as shown in FIG. 16 and are surrounded by frame lines on the reference image.

The object detection module 12 detects as objects [side wall S1], [object O1], [side wall S2], [object O2, corner point C, side wall S3], [object O3], [side wall S5, corner point C, object O5], [object O6] and [side wall S6] in this way. In addition, as is shown in FIG. 17, the object detection module 12 calculates rectangular frame lines which surround the objects detected on the reference image T.

The object detection module 12 outputs information on the objects detected in the way described above, coordinates of end points of subgroups and coordinates of apexes of the frame lines on the reference image T and store them in the memory.

In addition, the object detection module 12 changes threshold values for object detection such as a Z-axis direction between the adjacent points of the points in the actual space according to the index It of reliability in disparity dp which is transmitted from the reliability evaluation module 10. Specifically, as the variance (dp2 of the disparity dp becomes large and hence, the index It of reliability in disparity dp increases, the object detection module 12 changes, while attaining matching with the information of the objects detected in the past sampling cycles, for example, the threshold values so that they take larger values, so as to relax the standard for grouping.

Next, the function of the object detection system 1 according to the embodiment will be described.

The reliability evaluation module 10 observes the evaluation window We set on the range image Tz and calculates variances (dp2 of the disparities dp for the pixel blocks within the evaluation window We according to Equation (9) above. Then, the reliability evaluation module 10 calculates an index It of reliability in disparity dp which corresponds to the variance (dp2 of the disparity calculated according to the graph shown in FIG. 7 and outputs the index It of reliability in disparity dp so calculated.

The first histogram generation module 11a of the histogram generation module 11 sets the transverse width of the strip-like segments Dn, for example, to a width of four pixels which corresponds to the transverse width of the pixel block of the reference image T which is subjected to the stereo matching operation by the image processor 7 of the distance information calculation unit 6 to divide the range image Tz and generates the first histograms H1n associated with the disparities dp of the respective segments Dn in the standard state where the variance (dp2 of the disparity dp is small and the maximum value of the index It of reliability in disparity dp is outputted.

The second histogram generation module 11b of the histogram generation module 11 performs the predetermined filtering operation, that is, in this embodiment the temporal smoothing operation according to Equation (10) above on the frequencies F1nm of the classes of the first histograms individually to calculate the true values F1nmreal(t) of the frequencies, so as to generate the second histograms for the segments Dn individually.

However, in the standard state, the constant Pt=1, and as is expressed by Equation (11) above, the real values F1nmreal (t) of the frequencies equal the frequencies F1nm(t) of the classes C1nm of the first histograms H1n which were generated by the first histogram generation module 11a in the sampling cycle (t), and the second histograms H2n take the same shape as that of the first histograms H1n in the corresponding segments. Due to this, in this embodiment, it may be configured such that the first histograms constitute directly the second histograms without operating the calculations in Equations (10), (11) in the standard state.

The second histogram generation module 11b outputs the largest class Cnmax which is equal to or more than the threshold value and which imparts the largest frequency in the frequencies F2nm of the classes of the second histogram H2n of each segment Dn, and the object detection module 12 calculates the distances Z from the subject vehicle to the objects based on the information on the largest class Cnmax in each segment Dn for grouping to thereby detect the objects surrounding the subject vehicle.

In addition, when the variances (dp2 of the disparities dp of the pixel blocks within the evaluation window We on the range image Tz become large due to rainy weather or dirt sticking to the windscreen and the reliability evaluation module 10 outputs the index It of reliability in disparity dp having a larger value than that corresponding to the variance (dp2 of the disparity dp calculated according to the graph shown in FIG. 7, the first histogram generation module 11a of the histogram generation module 11 changes to increase the transverse width of the segments Dn which divide the range image Tz to twice, three times, ... thereof.

Namely, as has been described above, in the event that the transverse width of each segment Dn is four pixels in the standard state, the transverse width is extended to a 8-pixel width, a 12-pixel width, ... according to the value of the index It of reliability in disparity dp. Due to this, although the resolution in the transverse direction, that is, in the X-axis direction for obtaining the distances Z to objects decreases, the number of pixel blocks increases which have the valid disparities dp which belong to each segment Dn by extending the transverse width of the segment Dn.

Figure 18A:
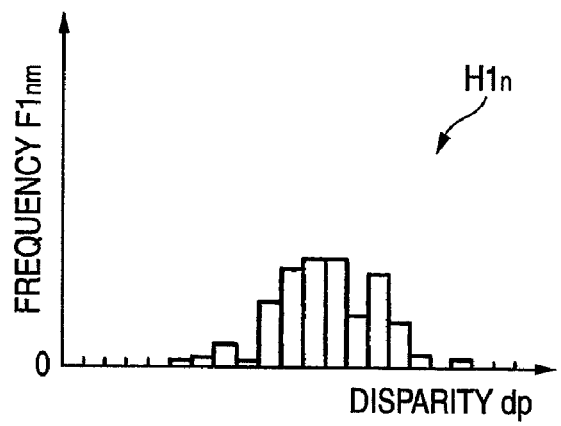
FIG. 18 is Diagrams showing two first histograms in which frequencies are dispersed and largest classes are not clear in the standard state.
Figure 18B:
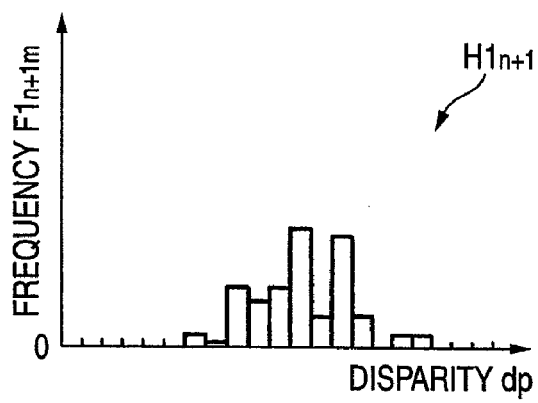
Figure 19:
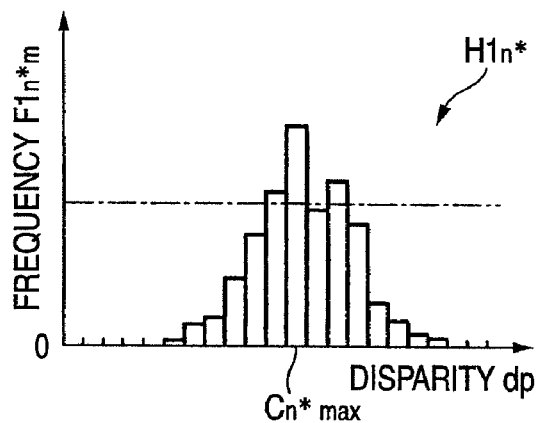
FIG. 19 is a diagram showing a first histogram that is generated from the two first histograms in FIG. 18 by changing transverse widths of segments.

Due to this, when the range image Tz is divided with the transverse width of the segment Dn being the 4-pixel width, for example, although frequencies F1nm, F2nm of first histograms H1n, H1n+1 which are generated for segments Dn, Dn+1 disperse as shown in FIGS. 18A, 18B, whereby the largest classes Cnmax get unclear, when the transverse width of each segment Dn is increased to be an 8-pixel width, the segments Dn, Dn+1 are integrated into a new segment Dn*, in which the frequencies F1nm, F2nm of the first histograms H1n, H1n+1 are added together for each class, so as to obtain a first histogram H1n* in which a class Cn*max having a largest frequency can clearly be discriminated as is shown in FIG. 19.

On the other hand, when the variances (dp2 of the disparities dp of the pixel blocks within the evaluation window We on the range image Tz become large due to rainy weather or dirt sticking to the windscreen, there may emerge a situation where the values of the frequencies F1nm of the classes C1nm of the first histogram H1n fluctuate largely so that the values increase or decrease in each sampling cycle t.

Figure 20:
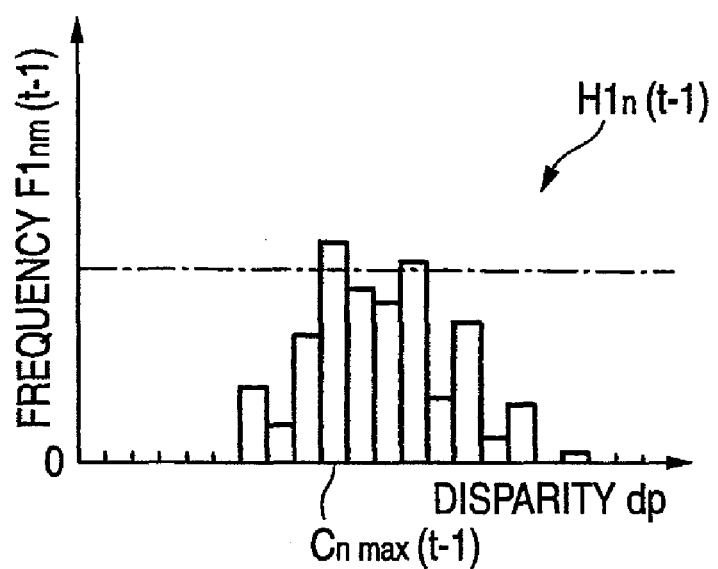
FIG. 20 is diagrams showing frequencies of the first histogram which varies temporally in two sampling cycles, FIG. 21 a diagram showing a first histogram that is obtained by changing the width of classes, and FIG. 22 a diagram which explains a spatial smoothing operation in a histogram generation module.
Figure 20:
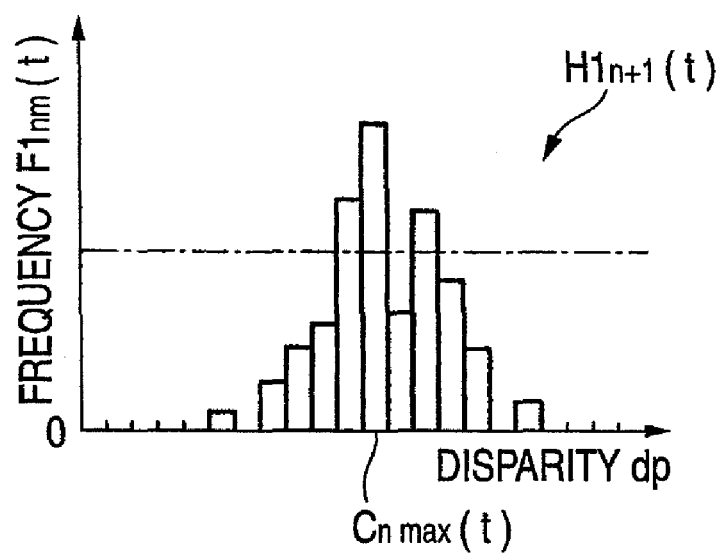

When this is attempted to be represented by the first histogram H1n(t) in each sampling cycle t, for example, as is shown by first histograms H1n(t−s), H1n(t) in FIGS. 20A, 20B, frequencies F1nm(t) vary in each sampling cycle t and a class having a largest frequency varies, and moreover, a temporal variation of this largest class Cnmax(t) generated in each segment Dn varies variously. Due to this, when objects are detected by the object detection module 12 based on the information on the largest class Cnmax(t) in each segment Dn, there may emerge a problem that a large detection error is generated or an error is caused in grouping to generate a detection error.

In this embodiment, however, the value of the time constant Pt in Equation (10) above is changed to decrease as the reliability index It increases by the second histogram generation module 11a of the histogram generation module 11, and the temporal smoothing operation is applied to the frequencies F1nm of the classes C1nm of each first histogram H1n so as to calculate the true values F1nmreal(t) of the frequencies. Then, by generating for each segment Dn the second histogram H2n which uses the true frequencies F1nmreal (t) so calculated for the frequencies of the classes thereof, the second histogram H2n shown in FIG. 13 in which the frequencies translates temporally smoothly can be obtained based on the first histogram H1n(t) as shown in FIGS. 20A, 20B in which the frequencies fluctuate violently in each sampling cycle.

Then, the largest class Cnmax(t) is calculated for each segment Dn based on the second histogram H2n which uses the true frequencies F1nmreal for the frequencies of the classes thereof, and objects are detected by the object detection module 12 based on the information, whereby it becomes possible to detect objects stably without causing an erroneous detection or a large detection error.

As has been described heretofore, according to the object detection system 1 according to the embodiment, even when the captured images are distorted or noise such as extra light is mixed due to it raining or the glass such as the windscreen disposed in front of the image picture modules getting dirty, by changing to decrease appropriately the resolution for histogram generation such as the resolution in the transverse direction in the actual space for calculating distances to objects or temporal resolution, variations in distances to objects to be detected or positions of objects can be suppressed so as to detect objects in a stable fashion, thereby making it possible to detect objects lying on the periphery of the subject vehicle with high reliability by analyzing the captured images.

In addition, since there is no need to provide, for example, a radar system in addition to the image capture units, an increase in production costs of the system can be suppressed, thereby making it possible to realize a reduction in market price thereof.

Note that while in the embodiment, the situation has been described in which the variance (dp2 of the disparity dp expressed by Equation (9) is used as the index of reliability in disparity dp, the index of reliability in disparity dp is not limited to the index calculated by using the variance (dp2 of the disparity dp provided that the index is such as to indicate whether or not the resolution for histogram generation needs to be changed.

In addition, while in the embodiment, the situation has been described in which the size of the segments Dn, that is, the transverse width of the strip-like segments Dn which divide the range image Tz is changed according to the index It of reliability in disparity dp calculated by the reliability evaluation module 10, other than or in addition to the change in the transverse width of the segments Dn, it becomes possible to change the class width by which the first histogram H1$n$ is divided into classes C1$nm$.

Figure 21:
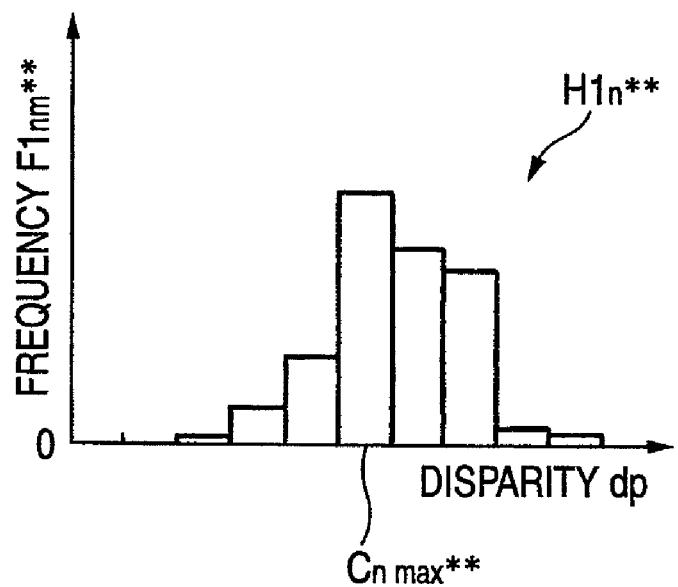

Namely, by configuring such that the class width which class divides the first histogram H1$n$ into the classes C1$nm$ is widened, for example, as the variance (dp2 of the disparity dp becomes large and the index It of reliability in disparity dp increases, the frequencies F1$nm$ of the classes C1$nm$ which are collected in a dispersed fashion as is shown in FIG. 18A and are not clear enough to indicate the class having the peak frequency can be changed to make it possible to calculate a clear largest class Cnmax** by making double the class width of the classes as is shown in FIG. 21.

As this occurs, although the resolution in the Z-axis in the actual space for obtaining distances to objects is decreased by changing the class width of the classes C1$nm$ of the first histogram H1$n$, due to the largest class Cnmax** being calculated clearly and stably, objects can be detected with good detection stability, thereby making it possible to detect objects lying around the subject vehicle with high reliability by analyzing the captured images.

Furthermore, while in the embodiment, the situation has been described in which the disparity dp of the pixel block which belongs to the segment Dn of the range image Tz is simply cast to the corresponding class C1$nm$ of the first histogram of interest as a vote by the first histogram generation module 11$a$ of the histogram generation module 11, in addition to this, for example, although the illustration thereof is omitted, in casting the disparity dp to the first histogram, it is also possible to the disparity dp is cast to be distributed not only to the class of the interest but also to classes which surround the class of interest according to a predetermined distribution. For example, the Gaussian distribution can be used as the predetermined distribution.

In addition, in addition to the change in the transverse width of the strip-like segments or the change in class width of the classes C1$nm$ of the first histogram H1$n$, it is possible to configure such that the extent of the distribution range is changed according to the index It of reliability in disparity dp. Changing the extent of the distribution range is changed means that for example in the Gaussian distribution, the width is changed by half thereof.

By adopting the configuration like this, even when the variance (dp2 of the disparity dp becomes large and the frequencies collected to the classes of the first histogram H1$n$ are dispersed to the various classes, the frequency of the class C1$nm$ which appears as a result of comparatively large frequencies being collected to the perimeter thereof is caused to appear large due to the influences of the surrounding classes, thereby making it possible to calculate a largest class clearly. Due to this, objects can be detected with good stability, thereby making it possible to detect objects lying around the subject vehicle with high reliability by analyzing the captured images.

In addition, while in this embodiment, the situation has been described in which as the filtering operation by the second histogram generation module 11$b$ of the histogram generation module 11, the temporal smoothing operation is performed according to Equation (10), it is also possible to other filtering operations are performed.

Figure 22:
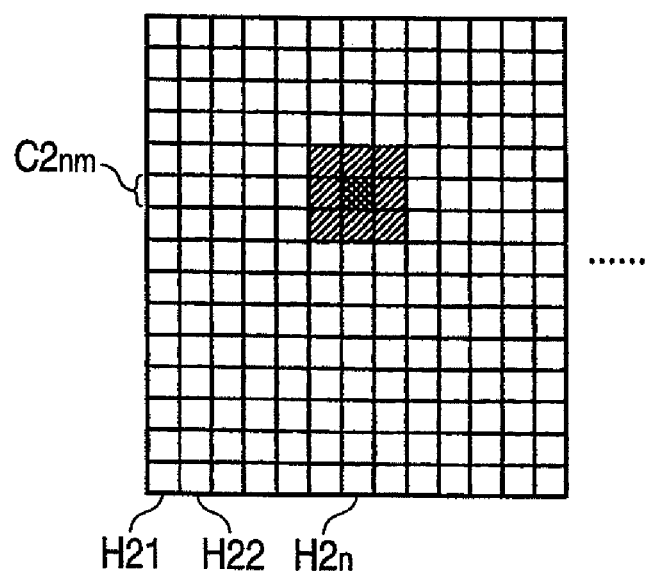

For example, it can be configured such that a spatial smoothing operation is performed as the filtering operation. In the spatial smoothing operation, for example, when the second histograms H2$n$ which are generated for segments Dn individually are disposed such that corresponding classes are aligned into a straight line as is shown in FIG. 22, in allocating the frequency F1$nm$ of the first histogram H1$n$ to the class C2$nm$ of the corresponding second histogram H2$n$, the frequency F1$nm$ can be distributed and allocated not only to the class C2$nm$ of interest which is shown by a mesh pattern in the figure but also to classes, which are shown as shaded with oblique lines, of the second histogram H2$n$ to which the histogram of interest belongs and the histograms H2$n$+1, . . . , H2$n$−1, . . . which surround the class C2$nm$ of interest according to the predetermined distribution.

In this case, too, for example the Gaussian distribution can be used as the predetermined distribution, and it can be configured such that the ratio of distribution to the surrounding classes is changed by changing the width by half thereof according to the index It of reliability in disparity dp. Consequently, the distribution range is not limited to the eight classes which surround the class of interest C2$nm$ shown in FIG. 22.

By adopting the configuration like this, in place of the temporal smoothing operation that has been described above, it becomes possible to smooth the frequency F2$nm$ of the classes C2$nm$ of each second histogram H2$n$ whose size varies largely when the variance (dp2 of the disparity dp becomes large so as to calculate the true value of the frequency, thereby making it possible to calculate the largest class Cnmax in those classes accurately and stably.

In addition, the object detection module 12 of the embodiment detects the objects by surrounding them by the frame lines on the reference image T as is shown in FIG. 17. Due to this, the reliability evaluation module 10 can make use of the frame lines, and in place of setting the evaluation window We in the preset region in the range image Tz as is shown in FIG. 5, it becomes possible to set the evaluation window, for example, to a region on the range image Tz which corresponds to an object running on the same driving lane as that of the subject vehicle which was detected in the last sampling cycle, that is, the region surrounded by the frame line which surrounds the object O3 when referring to the example shown in FIG. 17.

By adopting the configuration like this, the possibility is enhanced that an object is detected within the evaluation window so set in the next sampling cycle, and the disparity dp can accurately be calculated in the edge portion of the object so that a statistic value such as the variance (dp2 of the disparity dp is calculated accurately, thereby making it possible to calculate the index It of reliability in disparity dp based thereon. Due to this, the index It of reliability in disparity dp can be calculated with high reliability, and the resolution for histogram generation can be changed accurately based on the reliability index It so calculated, thereby making it possible to detect objects surrounding the subject vehicle with high reliability.

What is claimed is:

1. An object detection system comprising:
    a plurality of image capture units for capturing images including a reference image and a comparing image;
    a distance information calculation unit for dividing the reference image into a plurality of pixel blocks, searching corresponding pixel positions within the comparative image for each of the pixel blocks, calculating distance information for each of the pixel blocks, and forming a range image representing distance information;
    a histogram generation module for dividing the range image into a plurality of segments having predetermined sizes, and generating a histogram relating to the distance information by voting the distance information of the pixel blocks to the histogram of the respective segments;
    an object detection module for detecting an object based on frequencies of classes to each of the histograms; and
    a reliability evaluation module for calculating an index of reliability of the distance information of each of the pixel blocks,
    wherein the histogram generation module changes a resolution for generating the histogram according to the index of reliability of the distance information of each of the pixel blocks, and wherein the histogram generation module changes, as the resolution for generating the histogram, at least one of the size of the segments which divide the range image, a size of class divisions of the histogram, and an extent of a distribution range in voting by distributing the distance information of the pixel blocks to the classes of the histogram and classes which surround the classes of the histogram according to the index of reliability of the distance information of each of the pixel blocks.

2. An object detection system comprising:
    a plurality of image capture units for capturing images including a reference image and a comparing image;
    a distance information calculation unit for dividing the reference image into a plurality of pixel blocks, searching corresponding pixel positions within the comparative image for each of the pixel blocks, calculating distance information for each of the pixel blocks, and forming a range image representing distance information;
    a histogram generation module for dividing the range image into a plurality of segments having predetermined sizes, and generating a histogram relating to the distance information by voting the distance information of the pixel blocks to the histogram of the respective segments;
    an object detection module for detecting an object based on frequencies of classes to each of the histograms; and
    a reliability evaluation module for calculating an index of reliability of the distance information of each of the pixel blocks, wherein
    the histogram generation module changes a resolution for generating the histogram according to the index of reliability of the distance information of each of the pixel blocks,
    the histogram generation module further generates a second histogram for the respective segments based on the frequencies of the classes of the histogram implemented in predetermined filtering operations, and parameters for the predetermined filtering operations are changed according to the indexes of reliability of the distance information of the respective pixel blocks.

3. The object detection system according to claim 2, wherein
    the histogram generation module implements, as the predetermined filtering operation, a temporal smoothing operation for calculating a true value in the current sampling cycle by smoothing a temporal variation in the frequency of each class in each class of each histogram, and generates the second histogram by allocating the true values of the classes to corresponding classes of the second histogram.

4. The object detection system according to claim 3, wherein
    the parameter for the predetermined filtering operation which is to be changed is a time constant which is used in the temporal smoothing.

5. The object detection system according to claim 2, wherein
    when the second histogram is arranged so that the corresponding classes are aligned into a straight line, in allocating the frequencies of the classes of the histogram to the corresponding classes of the second histogram, as the predetermined filtering operation, the histogram generation module implements a spatial smoothing operation for executing the allocation by distributing the frequencies to the class and classes of the second histogram to which the class belongs and the second histogram surrounding the second histogram of the class which surround the class of interest according to a predetermined distribution, so as to generate the second histogram.

6. The object detection system according to claim 5,
    wherein the parameter for the predetermined filtering operation which is to be changed is a distribution ratio for the classes which surrounds the classes in the spatial smoothing operation.

7. The object detection system according to claim 1, wherein
    the reliability evaluation module sets an evaluation window in a predetermined image area in the range image and calculates an index of reliability of the distance information of each of the pixel blocks based on a statistical value of the distance information of each of the pixel blocks within the evaluation window.

8. The object detection system according to claim 1, wherein
    the reliability evaluation module sets an evaluation window in an image area occupied by an object detected by the object detection module on the captured image which constitutes the reference and calculates an index of reliability of the distance information of each of the pixel blocks based on a statistical value of the distance information of each of the pixel blocks within the evaluation window so set.

9. The object detection system according to claim 1, wherein
the object detection module changes a threshold value for detection of the object based on the index of reliability of the distance information of each of the pixel blocks which is calculated by the reliability evaluation module.

10. A method for detecting an object comprising:
capturing a plurality of images with a plurality of image capture units including a reference image and a comparative image;
dividing the reference image into a plurality of pixel blocks, searching corresponding pixel positions within the comparative image for each of the pixel blocks, calculating distance information for each of the pixel blocks, and forming a range image representing distance information from a distance information calculation unit;
dividing the range image into a plurality of segments having predetermined sizes, and generating a histogram relating to the distance information by voting the distance information of the pixel blocks to the histogram of the respective segments with a histogram generation module;
detecting an object based on frequencies of classes to each of the histograms with an object detection module; and
calculating an index of reliability of the distance information of each of the pixel blocks with a reliability evaluation module,
wherein, in generating a histogram, the histogram generation module changes a resolution for generating the histogram according to the index of reliability of the distance information of each of the pixel blocks, and
wherein the histogram generation module changes, as the resolution for generating the histogram, at least one of the size of the segments which divide the range image, a size of class divisions of the histogram, and an extent of a distribution range in voting by distributing the distance information of the pixel blocks to the classes of the histogram and classes which surround the classes of the histogram according to the index of reliability of the distance information of each of the pixel blocks.

11. A method for detecting an object comprising:
capturing a plurality of images with a plurality of image capture units including a reference image and a comparative image;
dividing the reference image into a plurality of pixel blocks, searching corresponding pixel positions within the comparative image for each of the pixel blocks, calculating distance information for each of the pixel blocks, and forming a range image representing distance information from a distance information calculation unit;
dividing the range image into a plurality of segments having predetermined sizes, and generating a histogram relating to the distance information by voting the distance information of the pixel blocks to the histogram of the respective segments with a histogram generation module;
detecting an object based on frequencies of classes to each of the histograms with an object detection module; and
calculating an index of reliability of the distance information of each of the pixel blocks with a reliability evaluation module, wherein, in generating a histogram, the histogram generation module changes a resolution for generating the histogram according to the index of reliability of the distance information of each of the pixel blocks, and wherein, the histogram generation module further generates a second histogram for the respective segments based on the frequencies of the classes of the histogram implemented in predetermined filtering operations, and parameters for the predetermined filtering operations are changed according to the indexes of reliability of the distance information of the respective pixel blocks.

12. An object detection system comprising:
a plurality of image capture units for capturing images including a reference image and a comparing image;
a distance information calculation unit for dividing the reference image into a plurality of pixel blocks, searching corresponding pixel positions within the comparative image for each of the pixel blocks, calculating distance information for each of the pixel blocks, and forming a range image representing distance information;
a histogram generation module for dividing the range image into a plurality of segments having predetermined sizes, and generating a histogram relating to the distance information by voting the distance information of the pixel blocks to the histogram of the respective segments;
an object detection module for detecting an object based on frequencies of classes to each of the histograms; and
a reliability evaluation module for calculating an index of reliability of the distance information of each of the pixel blocks,
wherein the histogram generation module changes a resolution for generating the histogram according to the index of reliability of the distance information of each of the pixel blocks, and
wherein the reliability evaluation module sets an evaluation window in a predetermined image area in the range image and calculates an index of reliability of the distance information of each of the pixel blocks based on a statistical value of the distance information of each of the pixel blocks within the evaluation window.

13. An object detection system comprising:
a plurality of image capture units for capturing images including a reference image and a comparing image;
a distance information calculation unit for dividing the reference image into a plurality of pixel blocks, searching corresponding pixel positions within the comparative image for each of the pixel blocks, calculating distance information for each of the pixel blocks, and forming a range image representing distance information;
a histogram generation module for dividing the range image into a plurality of segments having predetermined sizes, and generating a histogram relating to the distance information by voting the distance information of the pixel blocks to the histogram of the respective segments;
an object detection module for detecting an object based on frequencies of classes to each of the histograms; and
a reliability evaluation module for calculating an index of reliability of the distance information of each of the pixel blocks, wherein the histogram generation module changes a resolution for generating the histogram according to the index of reliability of the distance information of each of the pixel blocks, and
wherein the reliability evaluation module sets an evaluation window in an image area occupied by an object detected by the object detection module on the captured image which constitutes the reference and calculates an index of reliability of the distance information of each of the pixel blocks based on a statistical value of the distance information of each of the pixel blocks within the evaluation window so set.

14. An object detection system comprising:
a plurality of image capture units for capturing images including a reference image and a comparing image;
a distance information calculation unit for dividing the reference image into a plurality of pixel blocks, searching corresponding pixel positions within the comparative image for each of the pixel blocks, calculating distance information for each of the pixel blocks, and forming a range image representing distance information;
a histogram generation module for dividing the range image into a plurality of segments having predetermined sizes, and generating a histogram relating to the distance information by voting the distance information of the pixel blocks to the histogram of the respective segments;
an object detection module for detecting an object based on frequencies of classes to each of the histograms; and
a reliability evaluation module for calculating an index of reliability of the distance information of each of the pixel blocks, wherein the histogram generation module changes a resolution for generating the histogram according to the index of reliability of the distance information of each of the pixel blocks, and
wherein the object detection module changes a threshold value for detection of the object based on the index of reliability of the distance information of each of the pixel blocks which is calculated by the reliability evaluation module.

* * * * *